United States Patent
Liss

(10) Patent No.: US 6,428,084 B1
(45) Date of Patent: Aug. 6, 2002

(54) FUEL-EFFICIENT TRACTOR-TRAILER SYSTEM

(76) Inventor: Richard M. Liss, 15637 Norma La. Space #48, Surprise, AZ (US) 85379

(*) Notice: Subject to any disclaimer, the term of this patent is extended or adjusted under 35 U.S.C. 154(b) by 0 days.

(21) Appl. No.: 09/841,385

(22) Filed: Apr. 24, 2001

(51) Int. Cl.⁷ .................................................. B60J 1/00
(52) U.S. Cl. .............................. 296/180.3; 296/180.1; 296/180.2; 296/180.4
(58) Field of Search .................... 296/180.3, 180.2, 296/180.1, 180.4, 180.5, 217, 223; 180/903

(56) References Cited

U.S. PATENT DOCUMENTS

| | | | | |
|---|---|---|---|---|
| 2,101,793 A | | 12/1937 | Field, Jr. ................... | 280/33.1 |
| 3,947,065 A | * | 3/1976 | Geiger ..................... | 296/180.3 |
| 4,036,519 A | * | 7/1977 | Servais et al. ............ | 296/180.2 |
| 4,079,984 A | * | 3/1978 | Powell ..................... | 296/180.3 |
| 4,087,124 A | * | 5/1978 | Wiley, Jr. ................. | 296/180.2 |
| 4,156,543 A | * | 5/1979 | Taylor et al. ............. | 296/180.3 |
| 4,375,898 A | * | 3/1983 | Stephens .................. | 296/180.3 |
| 4,379,583 A | * | 4/1983 | Taylor et al. ............. | 296/180.3 |
| 4,518,188 A | | 5/1985 | Witten ........................ | 296/1 S |
| 4,611,796 A | * | 9/1986 | Orr ........................... | 296/180.2 |
| 4,749,220 A | * | 6/1988 | Adams et al. ............ | 296/180.3 |
| 4,779,915 A | * | 10/1988 | Straight ..................... | 296/180.3 |
| 4,824,165 A | * | 4/1989 | Fry ........................... | 296/180.3 |
| 4,904,015 A | * | 2/1990 | Haines ...................... | 296/180.3 |
| 5,078,448 A | | 1/1992 | Selzer et al. ............... | 296/180.2 |
| 5,190,342 A | | 3/1993 | Marlowe et al. ......... | 296/180.2 |
| 5,429,411 A | * | 7/1995 | Spears ...................... | 296/180.1 |
| 5,536,062 A | * | 7/1996 | Spears ...................... | 296/180.3 |
| D422,957 S | | 4/2000 | Damon et al. ............. | D12/196 |
| D424,495 S | | 5/2000 | Damon et al. ............. | D12/196 |
| D424,496 S | | 5/2000 | Damon et al. ............. | D12/196 |
| D431,511 S | | 10/2000 | Damon et al. ............. | D12/196 |
| 6,183,041 B1 | * | 2/2001 | Wilson ..................... | 296/180.2 |
| 6,267,434 B1 | * | 7/2001 | Casillas .................... | 296/180.1 |

FOREIGN PATENT DOCUMENTS

| | | | |
|---|---|---|---|
| DE | 2602580 | * | 7/1977 |
| DE | 2139165 | * | 2/1983 |
| GB | 2098152 | * | 5/1981 |

* cited by examiner

Primary Examiner—Ken Patel
(74) Attorney, Agent, or Firm—Martin L. Stoneman

(57) ABSTRACT

A fuel-efficient tractor-trailer system for improving the fuel mileage of a tractor-trailer combination by improving the air resistance that occurs in the area between the rear of the tractor and the front of the semi-trailer. The fuel-efficient tractor-trailer system provides an improved roof extension, which automatically raises when the tractor is put into reverse gear and an improved wheel mechanism for assisting the side extensions to slide around the semi-trailer ends when the tractor-trailer is turning. The fuel-efficient tractor-trailer system requires only modification to the tractor and not the trailer.

28 Claims, 4 Drawing Sheets

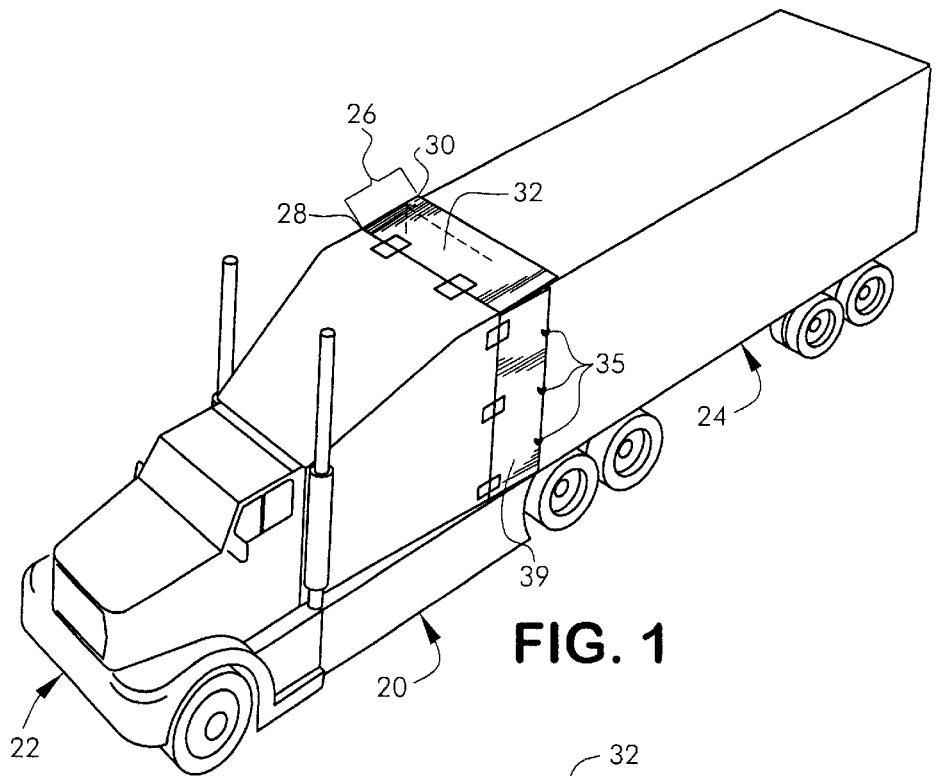
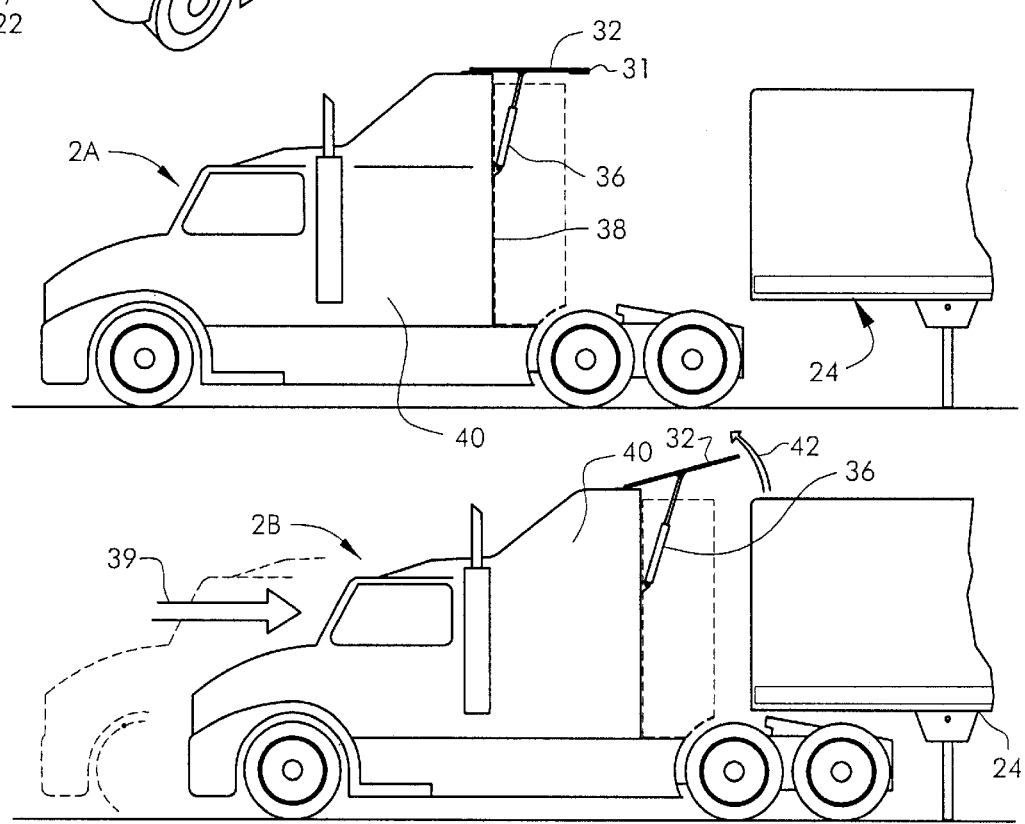
FIG. 1
FIG. 2

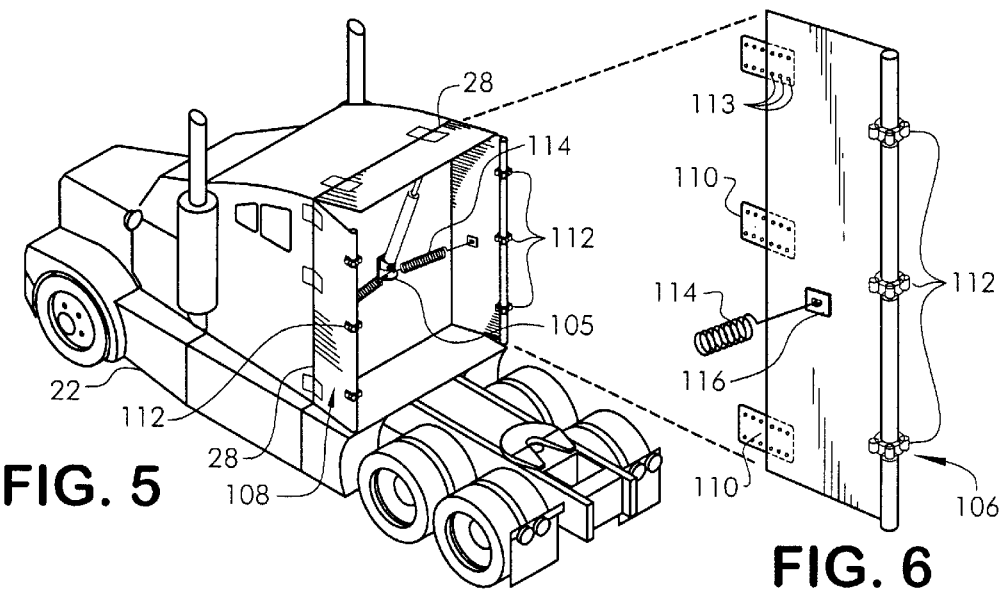
FIG. 5
FIG. 6
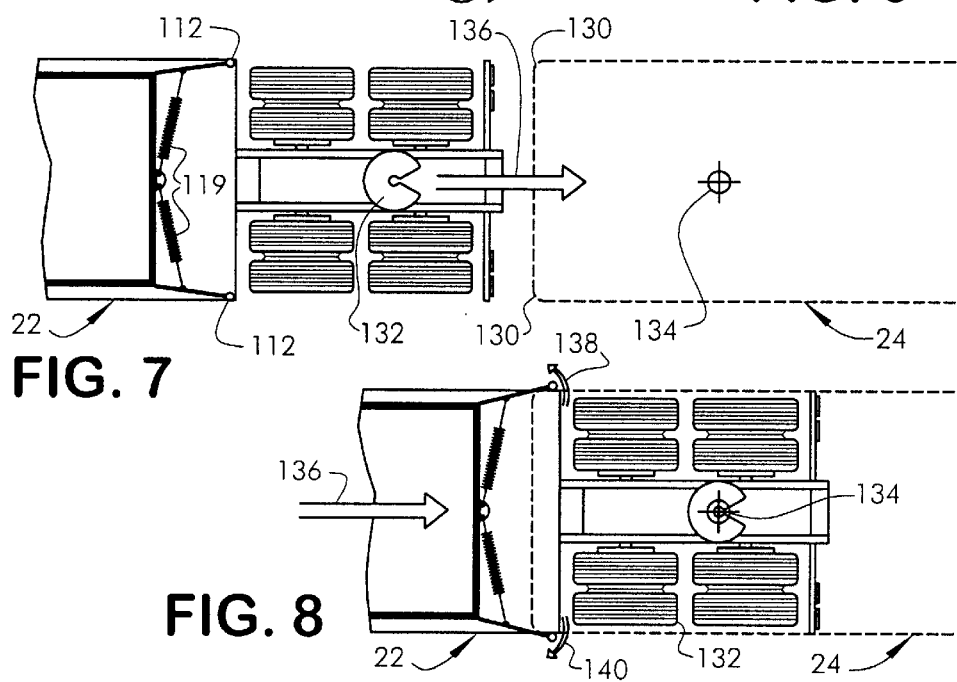
FIG. 7
FIG. 8
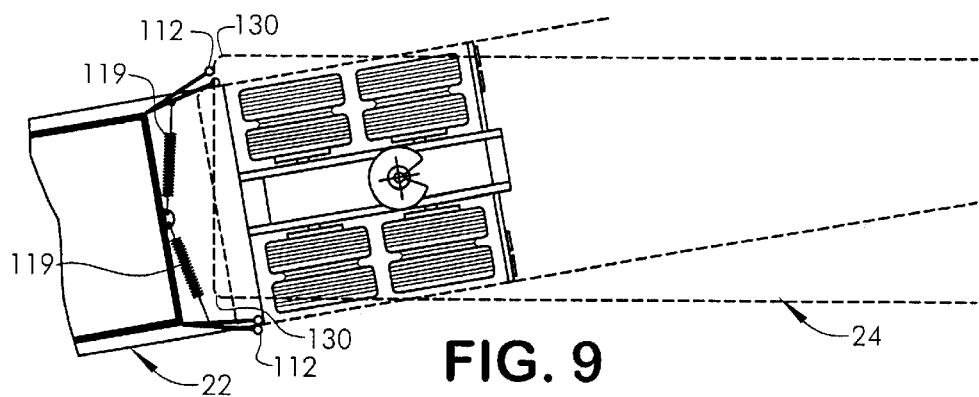
FIG. 9

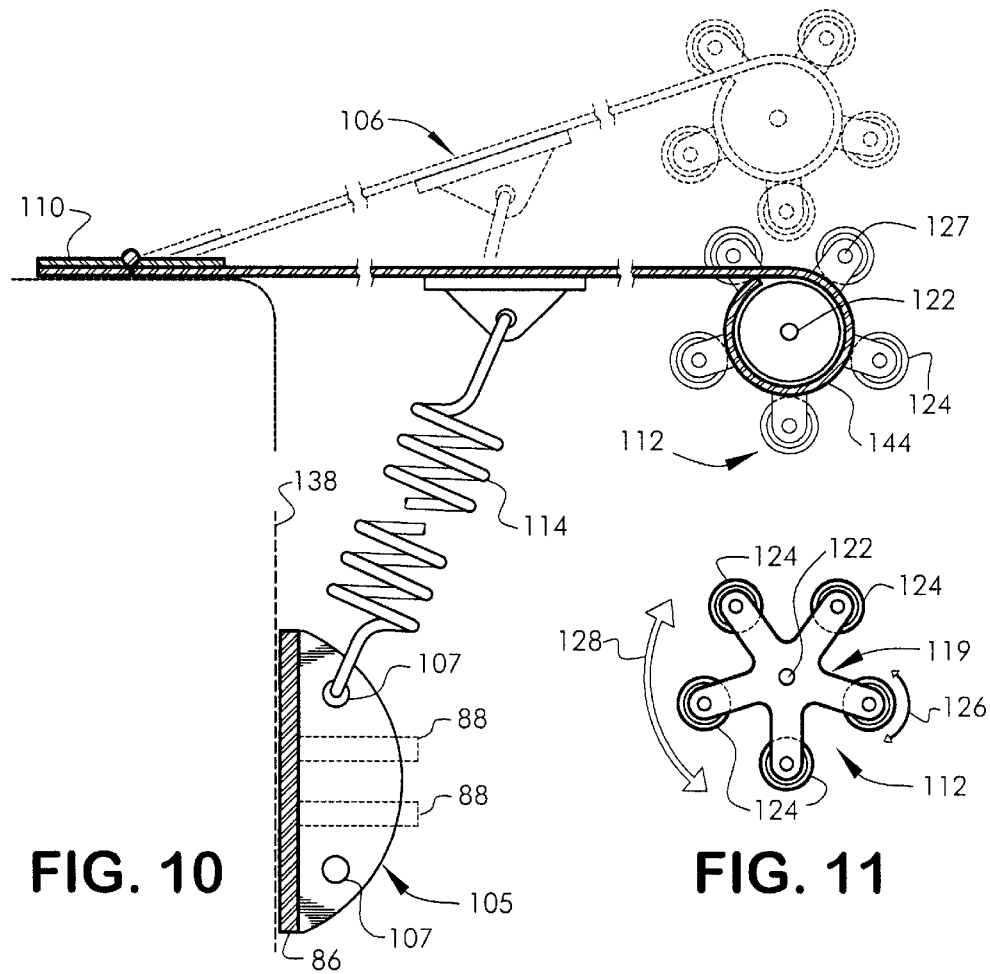
FIG. 10  FIG. 11
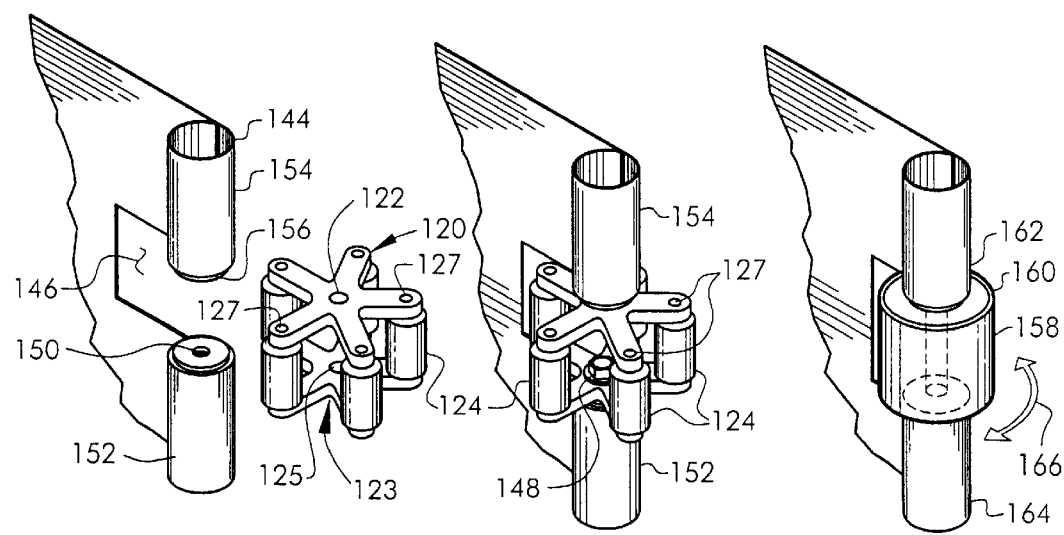
FIG. 12  FIG. 13  FIG. 14

FUEL-EFFICIENT TRACTOR-TRAILER SYSTEM

BACKGROUND

This invention relates to providing a system for improving the fuel mileage of a truck tractor (of the type typically used in combination with a semi-trailer, hereinafter simply referred to as a tractor), and semi-trailer combination by improving the air resistance that occurs in the area between the rear of the tractor and the front of the semi-trailer. The present invention improves the prior art by providing an improved roof panel extension system, which automatically raises the roof panel adjoining the tractor and the semi-trailer when the tractor is put into reverse gear. In addition, there is provided an improved wheel mechanism for the side panel extensions.

Typically, improvements to the airflow between the tractor cab portion and the semi-trailer portion relate to rigid or flexible extensions which are arranged to close the gap between the tractor cab portion and the semi-trailer portion. U.S. Pat. No. 5,078,448 discloses a device which provides a two-piece cab roof extender and multi-piece articulating side extenders to close the gap between the tractor cab portion and the semi-trailer portion. In addition, it discloses an automatic roof panel extender to raise the roof panel when the semi-trailer is being attached to the tractor by utilizing rotation of a cam-arm which is adjacent the fifth wheel mechanism and also utilizing a complicated cable and pulley arrangement to lift the cab roof portion. Further, the trailer portion requires a wear plate be mounted onto it to prevent the roof portion from wearing into the trailer top during transit. The cam and cable arrangement requires modifications to both the tractor and the semi-trailer. A problem with this arrangement is that should, during the coupling maneuver, the tractor back up towards the trailer and not connect with the cam-arm, the roof extension will not lift and the trailer will damage the roof extension.

OBJECTS OF THE INVENTION

A primary object and feature of the present invention is to provide a system for improving the fuel mileage of a tractor used in combination with a semi-trailer by improving the operation of the system controlling the panels that reduce air resistance in the area between the rear of the tractor and the front of the semi-trailer.

Another primary object and feature of the present invention is to provide a system for automatically raising the roof extension portion to sufficiently clear the semi-trailer anytime the tractor is placed in reverse gear, as typically occurs when the tractor is backing up to couple to the semi-trailer.

It is a further object and feature of the present invention to provide such a system with an improved rotation mechanism for the side panel extensions as they rotate against the side of the semi-trailer.

It is yet a further primary object and feature of the present invention to provide such a system having a wear plate mounted only on the roof extension portion of the tractor.

A further primary object and feature of the present invention is to provide such a system which is efficient, inexpensive, and handy.

Other objects and features of this invention will become apparent with reference to the following descriptions.

SUMMARY OF THE INVENTION

According to a preferred embodiment of the present invention, there is provided a system for providing a raisable rear roof extension of a cab of an over-the-road tractor, of the type used with a semi-trailer and having a transmission with a reverse gear actuator, comprising, in combination: a roof extension structured and arranged to provide a rearward extension element at about the level of a roof of the cab; a roof extension support structured and arranged to support, in a normally substantially horizontal position, such roof extension from a rear portion of the cab, and permit such roof extension to swivel upward and rearward; and a powered piston system structured and arranged to extend at least one piston in such manner as to swivel such roof extension upward and rearward. It also provides such a system further comprising a switch system structured and arranged to activate such powered piston system. And, it provides such a system wherein such powered piston system comprises at least one pneumatically-actuated piston; wherein such powered piston system comprises a pneumatically-actuated piston; and wherein such powered piston system further comprises a pneumatic connection to such at least one pneumatically-actuated piston to supply pneumatic pressure.

Additionally, it provides such a system wherein such switch system comprises: a switch structured and arranged, in a first position, to activate such powered piston system; wherein such switch is also structured and arranged, when in a second position, to de-activate such powered piston system. Further, it provides such a system wherein such switch: is operable by the reverse gear actuator and is structured and arranged to be activated when the transmission is placed into reverse gear and to be deactivated when the transmission is placed out of reverse gear. Even further, it provides such a system wherein such switch system comprises: a switch structured and arranged, in a first position, to activate such pneumatic connection to such at least one pneumatically-actuated piston for supplying pneumatic pressure; wherein such switch is also structured and arranged, when in a second position, to de-activate such pneumatic connection to such at least one pneumatically actuated piston for supplying pneumatic pressure. Moreover, it provides such a system wherein such switch: is structured and arranged to be operable by the reverse gear actuator; and is structured and arranged to be activated when the transmission is placed into reverse gear and to be deactivated when the transmission is placed out of reverse gear. It also provides such a system wherein such roof extension support comprises at least one hinge. And, it provides such a system wherein such roof extension support further comprises at least one hinge. Even further, it provides such a system further comprising an instrument panel notifier having a light, wherein such light is activated when such switch is in such first position. Still further, it provides such a system wherein such roof extension comprises a. wear-plate structured and arranged to assist such roof extension to slide over a top of the semi-trailer when the semi-trailer is coupled to the tractor.

According to another preferred embodiment of the present invention, there is provided a system, for use with an over-the-road tractor of the type used to pull a semi-trailer, to assist turning operations and efficient air flow when substantially covering top and side gaps at a rear of the tractor (and in front of the semi-trailer), comprising, in combination: a tractor having a transmission with a reverse gear actuator; at least one side panel structured and arranged to be hingedly attached to such tractor to essentially cover each of the side gaps; at least one return spring attached to each such at least one side panel; and at least one rotator attached to a rear end of such at least one side panel, wherein such rotator is structured and arranged to assist a sliding of such rear of such side panel along a side of the semi-trailer;

wherein such rotator comprises multiple sets of substantially different radii from a rotation-center of such rotator; a roof extension structured and arranged to provide a rearward extension element at about the level of a roof of the cab; a roof extension support structured and arranged to support, in a normally substantially horizontal position such roof extension from a rear portion of the cab, and permit such roof extension to swivel upward and rearward; and a powered piston system having at least one piston and structured and arranged to extend such piston in such manner as to swivel such roof extension upward and rearward.

It also provides such a system further comprising a switch system, attached solely to the tractor, structured and arranged to activate such piston. And, it provides such a system wherein such at least one rotator comprises a sprocket having a first central axis of rotation and multiple peripheral wheels each having a respective second axis of rotation. Further, it provides such a system wherein such sprocket comprises five such peripheral wheels. Even further, it provides such a system wherein such piston is pneumatically actuated. And further, it provides such a system further comprising a pneumatic connection to such at least one piston for supplying pneumatic pressure.

Additionally, it provides such a system wherein such switch system further comprises: a switch structured and arranged, in a first position, to activate such pneumatic connection to such pneumatically-actuated piston for supplying pneumatic pressure; wherein such switch is also structured and arranged, when in a second position, to de-activate such pneumatic connection to such pneumatically-actuated piston for supplying pneumatic pressure;. wherein such switch is structured and arranged to be operable by the reverse gear actuator; and wherein such switch is structured and arranged to be activated when the transmission is placed into reverse gear and to be deactivated when the transmission is placed out of reverse gear. It also provides such a system wherein such switch system further comprises: a switch structured and arranged, in a first position, to activate such piston; wherein such switch is also structured and arranged, when in a second position, to de-activate such piston; wherein such switch is structured and arranged to be operable by the reverse gear actuator; and wherein such switch is structured and arranged to be activated when the transmission is placed into reverse gear and to be deactivated when the transmission is placed out of reverse gear.

Even further, it provides such a system further comprising an instrument panel notifier having a light, wherein such light is activated when such switch is in such first position. And, it provides such a system wherein such roof extension support further comprises at least one hinge.

According to yet another preferred embodiment of the present invention, there is provided a system, for use with an over-the-road tractor of the type used to pull a semi-trailer, to assist turning operations and streamline functioning when closing the top and side gaps at the rear of the tractor (and in front of the semi-trailer), comprising, in combination: a tractor; at least one side panel structured and arranged to be hingedly attached to such tractor to essentially cover each of the side gaps; at least one return spring attached to each of such at least one side panels; and at least one rotator attached to the rear end of such at least one side panel, wherein such rotator is structured and arranged to assist a sliding of such rear of such side panel along a side of the semi-trailer; wherein such rotator comprises multiple sets of substantially different radii from a rotation-center of such rotator. Further, it provides such a system wherein such at least one rotator comprises a sprocket having a first central axis of rotation and multiple peripheral. wheels each having a respective second axis of rotation. And, it provides such a system wherein such sprocket comprises five such peripheral wheels.

According to yet another preferred embodiment of the present invention, there is provided a system for use with an over-the-road tractor of the type used to pull a semi-trailer, to assist turning operations and efficient air flow when substantially covering top and side gaps at a rear of the tractor (and in front of the semi-trailer), comprising, in combination: a tractor having a transmission with a reverse gear actuator and an air supply of compressed air; two side panels, each such side panel being respectively hingedly attached to such tractor to essentially cover each respective side gaps; at least one respective return spring attached to each respective side panel; and at least one rotator attached about every two vertical feet to each respective rear end of each respective such side panel wherein each such rotator is structured and arranged to assist a sliding of each such respective rear end of each respective side panel along each respective side of the semi-trailer; wherein at least one such rotator comprises: a sprocket having five peripheral wheels, wherein such sprocket rotates around a first central axis and each respective such five peripheral wheels independently rotate around a respective second central axis, a roof extension comprising a rearward extension element at about the level of a roof of the cab; wherein such roof extension comprises a wear-plate structured and arranged to assist such roof extension to slide over a top of the semi-trailer when the semi-trailer is coupled to the tractor; and a roof extension support structured and arranged to support, in a normally substantially horizontal position such roof extension from a rear portion of the cab, and permit such roof extension to swivel upward and rearward, wherein such roof extension support comprises at least one hinge; and a pneumatically-powered piston system attached to such air supply, for supplying pneumatic pressure to such piston, of such tractor structured and arranged to extend at least one piston in such manner as to swivel such roof extension upward and rearward; and a switch system, attached solely to the tractor, structured and arranged to activate such pneumatically-powered piston system comprising, a switch structured and arranged, in a first position, to activate such pneumatically-actuated piston for supplying pneumatic pressure, wherein such switch is also structured and arranged, when in a second position, to de-activate such pneumatically-actuated piston for supplying pneumatic pressure, wherein such switch is structured and arranged to be operable by such reverse gear actuator, and wherein such switch is structured and arranged to be activated when such transmission is placed into a reverse gear and to be deactivated when such transmission is placed out of a reverse gear. It also provides such a system wherein such two side panels further comprise a rolled end portion structured and arranged to strengthen such two side panels and support such at least one rotator.

According to still another preferred embodiment of the present invention, there is provided a system for operation of a pneumatic system of an over-the-road tractor comprising, in combination: a tractor having a transmission with a reverse gear actuator and having a pneumatic air supply; a switch system structured and arranged to be: operable by such reverse gear actuator and activated when such transmission is placed into a reverse gear and deactivated when such transmission is placed out of a reverse gear.

BRIEF DESCRIPTION OF THE DRAWINGS

FIG. 1 is a perspective view of the fuel-efficient truck system according to a preferred embodiment of the present invention.

FIGS. 2A and 2B are perspective views, partially in section illustrating the operation of the roof extension portion of the fuel-efficient truck system as it is placed into reverse gear according to a preferred embodiment of the present invention.

FIG. 5 is a perspective view illustrating a rear view of the tractor and panels of the fuel-efficient truck system according to a preferred embodiment of the present invention.

FIG. 6. is a perspective view of one of the side extension panels of the fuel-efficient truck system according to a preferred embodiment of the present invention.

FIG. 7 is a plan view illustrating the tractor and semi-trailer connecting sequence according to a preferred embodiment of the present invention.

FIG. 8 is a plan view illustrating the tractor and semi-trailer connecting sequence according to a preferred embodiment of the present invention.

FIG. 9 is a plan view illustrating the operation of the fuel-efficient truck system when the tractor and semi-trailer are turning according to a preferred embodiment of the present invention.

FIG. 10 is a plan view, partially in section of the side panel and roller assembly of the fuel-efficient truck system according to a preferred embodiment of the present invention.

FIG. 11 is a plan view of the multiple roller wheel assembly of the fuel-efficient truck system according to a preferred embodiment of the present invention.

FIG. 12 is a perspective view, partially in section, illustrating the installation and parts of the multiple roller wheel assembly of the fuel-efficient truck system according to a preferred embodiment of the present invention.

FIG. 13 is a perspective view, partially in section, illustrating the installation of the multiple roller wheel assembly of FIG. 12.

FIG. 14 is a perspective view, partially in section, illustrating a single roller assembly of the fuel-efficient truck system according to another preferred embodiment of the present invention.

DETAILED DESCRIPTION OF A PREFERRED EMBODIMENT OF THE INVENTION

Figure 3:
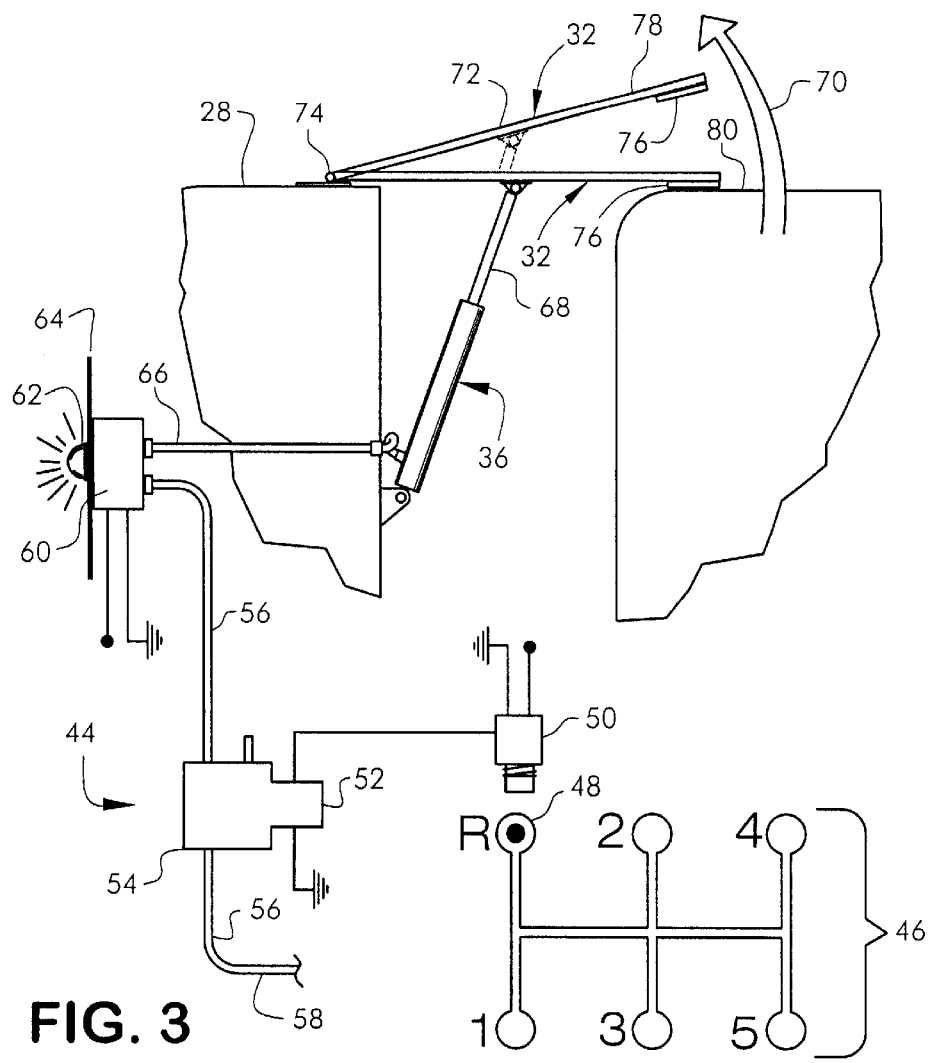
FIG. 3 is a sectional view illustrating the operation of the roof extension and diagrammatic view illustrating the switch mechanism of the fuel-efficient truck system according to a preferred embodiment of the present invention.

FIG. 1 is a perspective view of the fuel-efficient truck system 20 according to a preferred embodiment of the present invention. In a preferred embodiment, the fuel-efficient truck system 20 provides ways to improve a prior system for enhancing the fuel mileage of a tractor 22 and semi-trailer 24 combination, by improving the air flow and reducing the air resistance, that occurs in the spaces 26 (top gap and side gaps) between the rear 28 of the tractor 22 and the front 30 of the semi-trailer 24. In addition, a preferred embodiment of the invention provides an improved roof (the portion covering the top gap) lifting system, which automatically raises the roof extension portion 32 (embodying herein a roof extension structured and arranged to provide a rearward extension element at about the level of a roof of the cab) when the tractor 22 is put into reverse gear.

Additionally, a preferred embodiment of the invention provides for a new rotating wheel 35 assembly (embodying herein at least one rotator attached to a rear end of such at least one side panel, wherein such rotator is structured and arranged to assist a sliding of such rear of such side panel along a side of the semi-trailer) which is attached to side panel 34 (and the opposite side panel not shown in FIG. 1), which will be described further below in reference to FIGS. 6 through FIG. 13.

FIGS. 2A and 2B are perspective views, partially in section illustrating the operation of the roof extension portion 32 of the fuel-efficient truck system 20 as the tractor 22, having a transmission and gears for forward and reverse motion, is preferably placed into reverse gear, illustrated by arrow 39 (embodying herein a tractor having a reverse gear), according to a preferred embodiment of the present invention. As illustrated in FIG. 2A, the roof extension portion 32 preferably rests in about a substantially horizontal position 31 when tractor 22 is stopped or moving in the forward position. Preferably, the roof extension portion 32 is connected to a piston 36, as shown. Preferably, piston 36 is attached to the back 38 of the tractor cab 40. Preferably, piston 36 is an air operated piston (embodying herein wherein such powered piston system comprises at least one pneumatically-actuated piston; and, wherein such piston is pneumatically actuated) which is connected to an air supply system already installed on the tractor 22 for other systems, such as, for example, air brakes (this arrangement embodying herein wherein such powered piston system further comprises a pneumatic connection to such pneumatically-actuated piston to supply pneumatic pressure). As illustrated in FIG. 2B, when activated, the piston preferably raises roof extension portion 32 (embodying herein a powered piston system structured and arranged to extend at least one piston in such manner as to swivel such roof extension upward and rearward), as shown by arrow 42, upward and rearward, such that the roof extension portion 32 will sufficiently clear the semi-trailer 24 when tractor 22 is placed in reverse gear, as typically occurs when the tractor 22 is backing up to couple to the semi-trailer 24. This arrangement is preferred as the driver does not have to remember to lift the roof extension portion 32 nor does the driver need to be concerned that the roof extension portion 32 is lifted during the coupling maneuver (a problem in the prior art).

FIG. 3 is a sectional view illustrating the operation of the roof extension portion 32 and diagrammatic view illustrating the switch system 44 (embodying herein a switch system structured and arranged to activate such powered piston system; and, a switch system, attached solely to the tractor, structured and arranged to activate such piston) of the fuel-efficient truck system 20 according to a preferred embodiment of the present invention. Preferably, the tractor 22 transmission is operated by a gear shifter 46 (embodying herein a gear shift actuator). Preferably, when gear shifter 46 is placed in the reverse position 48, as shown, the gear shifter 46 contacts an electrical switch 50, activating the switch 50 (this arrangement embodying herein wherein such switch is operable by the reverse gear actuator and is structured and arranged to be activated when the transmission is placed into reverse gear). Preferably, electrical switch 50 opens a circuit (embodying herein a switch structured and arranged, in a first position, to activate such powered piston system), allowing power to be sent to an electrically controlled solenoid 52. Preferably, the electrically controlled solenoid 52 controls an air valve 54 (the above arrangement embodying herein a switch structured and arranged, in a first position, to activate such pneumatic connection to such at least one pneumatically-actuated piston for supplying pneumatic pressure). Preferably, air valve 54 opens and allows compressed air (air under pressure) to flow through air line 56 from an air source 58, preferably part of the compressed air system already installed on the tractor 22. Preferably, the compressed air travels from air line 56 through a pressure sensing indicator 60. Preferably, pressure sensing indicator 60 illuminates a light 62 on the dashboard 64 as the compressed air passes through it, indicating to the tractor 22 operator that the switch system 44 is operating and the roof extension portion 32 is lifting (this arrangement embodying herein an instrument panel notifier having a light, wherein such light is activated when such switch is in such first position). Under appropriate circumstances other arrangements with respect to air line routing may be useful. Preferably, the compressed air continues to flow from the pressure sensing indicator 60 through air line 66 to piston 36. Preferably, piston 36 extends a lifting member 68 which is attached to the roof extension portion 32, as shown. As piston 36 extends lifting member 68, roof extension portion 32 is raised as indicated by Arrow 70 (the above described arrangement embodying herein a pneumatically-powered piston system attached to such air supply, for supplying pneumatic pressure to such piston, of such tractor structured and arranged to extend at least one piston in such manner as to swivel such roof extension upward and rearward).

Preferably, removing the transmission from reverse gear by placing gear shifter 46 out of the reverse position 48, removes the gear shifter 46 from contact with electrical switch 50, de-activating the switch 50 (embodying herein wherein such switch is also structured and arranged, when in a second position, to de-activate such powered piston system), such that power is no longer sent to electrically controlled solenoid 52. Preferably, air valve 54 closes, stopping compressed air (air under pressure) from flowing through air line 56 from air source 58 (this arrangement embodying herein wherein such switch is also structured and arranged, when in a second position, to de-activate such pneumatic connection to such pneumatically actuated piston for supplying pneumatic pressure). Preferably, the compressed air traveling from air line 56 through pressure sensing indicator 60 ceases. Preferably, light 62 on the dashboard 64 ceases to be lit, indicating to the tractor 22 operator that the switch system 44 is off and the roof extension portion 32 is receding to its substantially horizontal position 31 (see FIG. 2A).

Figure 4:
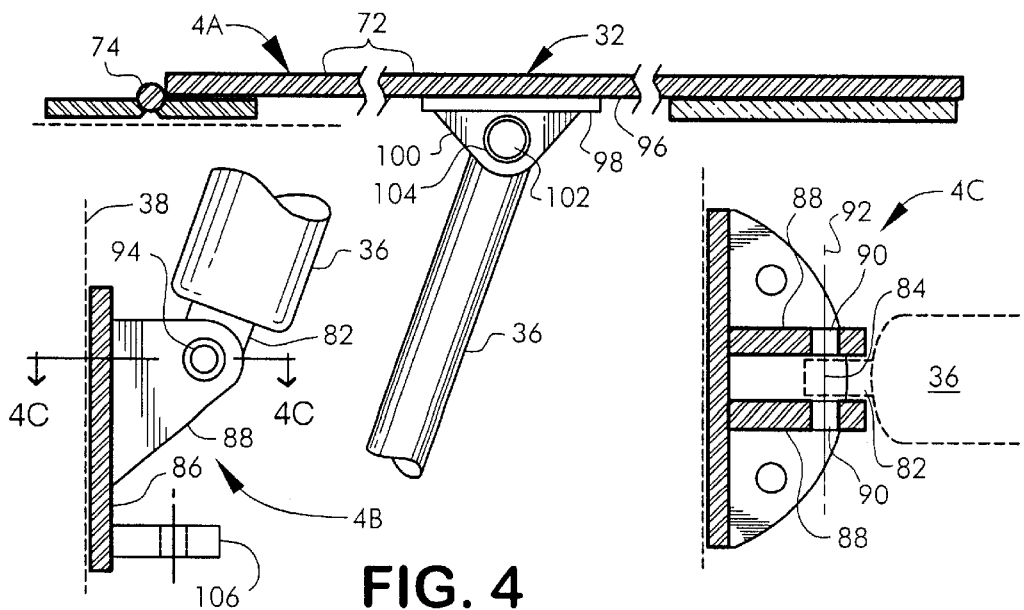
FIG. 4 illustrates the roof extension (4A) and includes both a side view (4B) and a plan view (4C) of the preferred connections to the tractor, semi-trailer and roof extension piston, according to a preferred embodiment of the present invention.

Reference will now be made to FIG. 4 with continued reference to FIG. 3. FIG. 4 illustrates the roof extension portion 32 (see FIG. 4A) and includes both a side view (see FIG. 4B) and a plan view (see FIG. 4C) of the preferred connections to the tractor 22, semi-trailer 24 and piston 36, according to a preferred embodiment of the present invention. Preferably, the roof extension portion 32 comprises a flat panel 72, attached to the rear 28 of the tractor 22 by a hinge 74 (embodying herein a roof extension support structured and arranged to support, in a normally substantially horizontal position, such roof extension from a rear portion of the cab; and, wherein such roof extension support further comprises at least one hinge). Preferably, hinge 74 allows for unrestricted vertical movement of panel 72, preferably upward and rearward, as shown, (embodying herein permit such roof extension to swivel upward and rearward) with at least enough vertical rise to clear the upper end of the front 30 of the semi-trailer 24 when in the lifted position. Under appropriate circumstances other arrangements with respect to hinges may be useful (for example, use of a piano hinge style). Preferably, panel 72 has a nylon wear plate 76 (embodying herein wherein such roof extension comprises a wear-plate structured and arranged to assist such roof extension to slide over a top of the semi-trailer when the semi-trailer is coupled to the tractor) attached to the end portion 78 of the panel 72, as shown. The nylon wear plate 76 is preferably made of a nylon material that will slide across the top 80 of semi-trailer 24 without scratching or unduly wearing out the top 80. The nylon wear plate 76 allows the top 80 of semi-trailer 24 to move below the roof extension portion 32 when, for example, the tractor 22 and semi-trailer 24 are turning (such as shown in FIG. 9). FIG. 4B and 4C illustrate a preferred connection for the piston 36 against the back 38 of the tractor cab 40 (see FIG. 2A). Preferably, the piston 36 has a single attachment plate 82 with a center aperture 84. Preferably, a vertical flat bracket 86 comprising two perpendicularly protruding planar brackets 88 and a protruding horizontal bracket 106 (further described in FIG. 10), are attached to the back 38 of the tractor cab 40, as shown. The vertical flat bracket 86 is preferably welded to the back 38 of the tractor cab 40. The protruding horizontal bracket 105 is preferably welded to the vertical flat bracket 86. The protruding planar brackets 88 are preferably welded to the vertical flat bracket 86. Preferably, the protruding planar brackets 88 each have a central aperture 90 with a common horizontal axis 92 which will align with the axis of aperture 84. Preferably, a locking pin assembly 94 is inserted into apertures 84 and 90, securing the piston 36 into the brackets 88 and thereby securing the piston 36 against the back 38 of the tractor cab 40, as shown. Under appropriate circumstances other arrangements with respect to the locking pin assembly 94 may be useful (for example, use of a bolt and nut arrangement). Preferably, horizontal bracket 105 has two apertures 107 which are used to attach to spring 114, which will be further explained in reference to FIG. 10 below.

Preferably, a similar bracketing method, as used for the piston 36 against the back 38 of the tractor cab 40, is utilized for attaching the lifting member 68 to the underside 96 of the panel 72. Preferably, a flat horizontal bracket 98 is welded to the underside 96 of the panel 72, as shown. Preferably, flat horizontal bracket 98 comprises two perpendicularly protruding planar brackets 100 attached to the flat horizontal bracket 98, preferably by welding. Preferably, the lifting member 68 has a single attachment plate with a center aperture (not shown) similar to that shown in FIG. 4C. Preferably, the protruding planar brackets 100 each have a central aperture 102 with a common horizontal axis similar to that shown in FIG. 4C, which will align with the axis of aperture 102. Preferably, a bolt and nut or locking pin assembly 104 is inserted into aperture 102 and the single attachment plate center aperture, securing the lifting member 68 into the planar brackets 100 and thereby securing the lifting member 68 and piston 36 to the panel 72 of the roof extension portion 32, as shown.

Reference will now be made to FIG. 5 and FIG. 6. FIG. 5 is a perspective view illustrating a rear view of the tractor 22 and side extension panels 106 and 108 (embodying herein two side panels, each such side panel being respectively hingedly attached to such tractor to essentially cover each respective side gaps) of the fuel-efficient truck system 20 according to a preferred embodiment of the present invention. FIG. 6 is a perspective view of one of the side extension panels 106 and 108 of the fuel-efficient truck system 20 according to a preferred embodiment of the present invention. Preferably, there are two side panels, a right rear panel 106 (passenger side) and a left rear panel 108 (drivers side), as shown.

Preferably, both a right rear panel 106 and a left rear panel 108 are similar in construction and operation other that being arranged slightly different with respect to operating on opposite sides (that is they operate in a symmetrical way). Therefore, only right rear panel 106, illustrated in FIG. 6, will now be described. Preferably, right rear panel 106 comprises a hinge means, attached along the rear 28 of the tractor 22, as shown. In the illustrated embodiment, the hinge means comprises three, preferably flat, door style hinges 110. Preferably, the hinges support the weight of the panel 106. Preferably, hinges 110 are attached to the tractor 22 and the right rear panel 106 by mechanical fasteners 113 such as screws or rivets, as shown. Under appropriate circumstances other arrangements with respect to hinges may be useful (for example use of a piano type hinge or use of a welded connection of the hinges 110). Preferably, right rear panel 106 also comprises a unique multiple roller wheel assembly 112 for use as a rolling mechanism. Preferably, multiple roller wheel assembly 112 provides a system for the right rear panel 106 to rotate around the edges of the semi-trailer (this arrangement embodying herein at least one rotator attached about every two vertical feet to each respective rear end of each respective such side panel wherein each such rotator is structured and arranged to assist a sliding of each such respective rear end of each such respective side panel along each respective side of the semi-trailer). Preferably, each of the multiple roller wheel assemblies 112 are located opposite each of the hinges 110, as shown. A return spring 114 is attached to each panel 106 and 108 by an attachment plate 116 on the panel 106 and 108 (this arrangement embodying herein at least one respective return spring attached to each respective side panel). The return spring is attached to the back 38 of the tractor cab 40 by attaching to aperture 107 on horizontal bracket 105. FIG. 10 further illustrates this arrangement.

FIG. 10 is a plan view, partially in section of the side panel 106 (also applicable to panel 108) and multiple roller wheel assembly 112 of the fuel-efficient truck system 20 according to a preferred embodiment of the present invention. Preferably, the return spring 114 maintains the panel 106 as close to the semi-trailer 24 as possible, especially during a moving vehicle transition, such as turning a corner. Preferably, the hinges 110 allow the panel 106 to swing outward away from the semi-trailer 24 such that when turning (as in FIG. 9) the semi-trailer 24 will not bind the panels 106 and 108. The combination of the hinges 110, multiple roller wheel assembly 112 (further explained below in FIGS. 11–13) and the return spring 114 working together provide a system wherein the panels 106 and 108 maintain a reduced air gap between the tractor 22 and the semi-trailer 24 regardless of the joined position of the tractor 22 and trailer 24 in relation to one another (such as when turning).

FIG. 11 is a plan view of the multiple roller wheel assembly 112 of the fuel-efficient truck system 20 according to a preferred embodiment of the present invention. FIG. 12 is a perspective view, partially in section, illustrating the installation and parts of the multiple roller wheel assembly 112 of the fuel-efficient truck system 20 according to a preferred embodiment of the present invention. FIG. 13 is a perspective view, partially in section, illustrating the installation of the multiple roller wheel assembly 112 of FIG. 12. As illustrated in FIG. 11, the multiple roller wheel assembly 112 preferably comprises five rollers 124 attached to a central sprocket assembly 119 having a central axis 122 (embodying herein wherein such sprocket comprises five such peripheral wheels). Preferably, there is an upper central assembly 120 having a central axis 122 (shown in FIG. 11) and a lower central assembly 123 having a central axis 125 (shown in FIG. 12). Preferably, both central axis 122 and 125 have the same axis. Preferably, each of the rollers 124 have separate axis (this arrangement embodying herein wherein such at least one rotator comprises a sprocket having a first central axis of rotation and multiple peripheral wheels each having a respective second axis of rotation), as shown and rotate, in either direction, a full 360 degrees as indicated by arrow 126 (this arrangement embodying herein wherein such rotator comprises multiple sets of substantially different radii from a rotation-center of such rotator). Preferably, each roller 124 is connected to the central assembly 120 by a riveted pin 127, which is connected to both the upper central assembly 120 and lower central assembly 123.

In addition, the entire multiple roller wheel assembly 112 rotates, in either direction, a full 360 degrees as indicated by arrow 128. Preferably, as one or more of the rollers 124 contact the edges 130 (see FIG. 7) of the semi-trailer, both the rollers 124 and the multiple roller wheel assembly 112 will rotate to allow the panel 106 to move past and around the semi-trailer 24 and maintain a reduced air gap between the tractor 22 and the semi-trailer 24 regardless of the joined position of the tractor 22 and trailer 24 in relation to one another (such as when turning). Preferably, the end 142 of the panels 106 and 108 is a rolled end 144, as shown (embodying herein wherein such two side panels further comprise a rolled end portion structured and arranged to strengthen such two side panels and support such at least one rotator), as shown in FIG. 10 and FIGS. 12–13. The rolled end 144 is preferable as rolling the end strengthens the panel and provides added rigidity to the panel 106 and end 142. Further, the rolled end 144 preferably provides an easy installation for removal and replacement of the multiple roller wheel assembly 112.

Preferably, multiple roller wheel assembly 112 is attached to the panels 106 and 108 at about two-foot intervals (embodying herein at least one rotator attached about every two vertical feet to each respective rear end of each respective such side panel wherein each such rotator is structured and arranged to assist a sliding of each such respective rear end of each such respective side panel along each respective side of the semi-trailer), such that there are about three roller wheel assemblies 112 on each panel, as shown. Preferably, the multiple roller wheel assembly 112 is inserted into a notched space 146 within the rolled end 144. Preferably, the notched space 146 is large enough to allow the rollers 124 to rotate along the central axis 122 and 125 so that the entire multiple roller wheel assembly 112 may rotate unrestricted by the panel 106 (or panel 108). Preferably, the multiple roller wheel assembly 112 is installed by inserting a bolt 148 through axis 125 and threadably inserting the bolt into a threaded end 150 along a bottom portion 152 of the notched space 146 within the rolled end 144, as shown in FIG. 13. Preferably, the multiple roller wheel assembly 112 is installed into a threaded end 156 along a top portion 154 of the notched space 146 within the rolled end 144 by inserting a bolt equal to bolt 148 (not shown) through axis 122 and threadably inserting the bolt into a threaded end 156. Under appropriate circumstances other arrangements with respect to attaching the multiple roller wheel assembly 112 to the notched space 146 within the rolled end 144 may be useful.

FIG. 14 is a perspective view, partially in section, illustrating a single roller assembly of the fuel-efficient truck system according to another preferred embodiment of the present invention. In this embodiment, there is just a single roller 158 with a single axis 160 threadably inserted into the rolled end 162 and end 164. Preferably, the single roller 158 rotates in either direction horizontally as indicated by arrow 166.

FIGS. 7, 8 and 9 illustrate the above description of the panels 106 and 108 and their operation even further.

Reference is now made to FIG. 7. FIG. 7 is a plan view illustrating the tractor 22 and semi-trailer 24 connecting sequence according to a preferred embodiment of the present invention. Typically, an over-the-road tractor 22 pulling a semi-trailer 24 comprises a fifth wheel assembly 132. The fifth wheel assembly is well known by those skilled in the art. In order to hook up the tractor 22 to the semi-trailer 24, it is necessary for the tractor 22 to back-up towards the semi-trailer 24, as illustrated by arrow 136, and align the fifth wheel assembly 132 with the semi-trailer ball hook-up portion 134. Preferably, during the above described back-up by the tractor 22, the roof extension portion 32 is lifted such that it will not be hit by the semi-trailer 24 during this hooking up maneuver. Refer to FIG. 8.

FIG. 8 is a plan view illustrating the tractor 22 and semi-trailer 24 connecting sequence according to a preferred embodiment of the present invention. Preferably, as the fifth wheel assembly 132 aligns with the semi-trailer ball hook-up portion 134, the panels 106 and 108 move outward away from the semi-trailer 24, as indicated by arrows 138 and 140 when engaged by the semi-trailer ends 130 during the hooking up maneuver (while in reverse gear). Preferably, after the fifth wheel assembly 134 is completed and the tractor 22 and semi-trailer 24 are hitched, the tractor 22 may be removed from reverse gear and transferred to a forward gear, thereby lowering the roof extension portion 32.

FIG. 9 is a plan view illustrating the operation of the fuel-efficient truck system 20 when the tractor 22 and semi-trailer 24 are turning according to a preferred embodiment of the present invention. As illustrated, the side panels 106 and 108 move outward away from the semi-trailer 24 and roll along the semi-trailer 24 as the tractor 22 and semi-trailer 24 turn. Again, as stated above, the combination of the multiple roller wheel assembly 112, the side panels 106 and 108, and the return spring 114 working together provide a system wherein the panels 106 and 108 maintain a reduced air gap between the tractor 22 and the semi-trailer 24 regardless of the joined position of the tractor 22 and trailer 24 in relation to one another, such as when turning.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A system for providing a raisable rear roof extension of a cab of an over-the-road tractor, of the type used with a semi-trailer and having a transmission with a reverse gear actuator, comprising, in combination:
   a) a roof extension structured and arranged to provide a rearward extension element at about the level of a roof of the cab;
   b) a roof extension support structured and arranged to
      i) support, in a normally substantially horizontal position, said roof extension from a rear portion of the cab, and
      ii) permit said roof extension to swivel upward and rearward; and
   c) a powered piston system structured and arranged to extend at least one piston in such manner as to swivel said roof extension upward and rearward.

2. The system according to claim 1 further comprising a switch system structured and arranged to activate said powered piston system.

3. The system according to claim 1 wherein said powered piston system comprises at least one pneumatically-actuated piston.

4. The system according to claim 2 wherein said powered piston system comprises at least one pneumatically-actuated piston.

5. The system according to claim 4 wherein said powered piston system further comprises a pneumatic connection to said at least one pneumatically-actuated piston to supply pneumatic pressure.

6. The system according to claim 2 wherein said switch system comprises:
   a) a switch structured and arranged, in a first position, to activate said powered piston system;
   b) wherein said switch is also structured and arranged, when in a second position, to de-activate said powered piston system.

7. The system according to claim 6 wherein said switch:
   a) is operable by the reverse gear actuator and
   b) is structured and arranged to be activated when the transmission is placed into reverse gear and to be deactivated when the transmission is placed out of reverse gear.

8. The system according to claim 5 wherein said switch system comprises:
   a) a switch structured and arranged, in a first position, to activate said pneumatic connection to said at least one pneumatically-actuated piston for supplying pneumatic pressure;
   b) wherein said switch is also structured and arranged, when in a second position, to de-activate said pneumatic connection to said at least one pneumatically actuated piston for supplying pneumatic pressure.

9. The system according to claim 8 wherein said switch:
   a) is structured and arranged to be operable by the reverse gear actuator; and
   b) is structured and arranged to be activated when the transmission is placed into reverse gear and to be deactivated when the transmission is placed out of reverse gear.

10. The system according to claim 1 wherein said roof extension support comprises at least one hinge.

11. The system according to claim 9 wherein said roof extension support comprises at least one hinge.

12. The system according to claim 7 further comprising an instrument panel notifier having a light, wherein said light is activated when said switch is in said first position.

13. The system according to claim 1 wherein said roof extension comprises a wear-plate structured and arranged to assist said roof extension to slide over a top of the semi-trailer when the semi-trailer is coupled to the tractor.

14. A system, for use with an over-the-road tractor of the type used to pull a semi-trailer, to assist turning operations and efficient air flow when substantially covering top and side gaps at a rear of the tractor (and in front of the semi-trailer), comprising, in combination:
   a) a tractor having a transmission with a reverse gear actuator;
   b) at least one side panel structured and arranged to be hingedly attached to said tractor to essentially respectively cover a respective side gap;

c) at least one return spring attached to each said at least one side panel; and d) at least one rotator attached to a rear end of said at least one side panel, wherein said rotator is structured and arranged to assist a sliding of said rear end of said side panel along a side of the semi-trailer;

e) wherein said rotator comprises multiple sets of substantially different radii from a rotation-center of said rotator;

f) a roof extension structured and arranged to provide a rearward extension element at about the level of a roof of the cab;

g) a roof extension support structured and arranged to
i) support, in a normally substantially horizontal position said roof extension from a rear portion of the cab, and
ii) permit said roof extension to swivel upward and rearward; and h) a powered piston system having at least one piston and structured and arranged to extend said at least one piston in such manner as to swivel said roof extension upward and rearward.

15. The system according to claim 14 further comprising a switch system, attached solely to the tractor, structured and arranged to activate said piston.

16. The system according to claim 14 wherein said at least one rotator comprises a sprocket having a first central axis of rotation and multiple peripheral wheels each having a respective second axis of rotation.

17. The system according to claim 16 wherein said sprocket comprises five said peripheral wheels.

18. The system according to claim 15 wherein said at least one piston is pneumatically actuated.

19. The system according to claim 18 further comprising a pneumatic connection to said at least one piston for supplying pneumatic pressure.

20. The system according to claim 19 wherein said switch system further comprises:
a) a switch structured and arranged, in a first position, to activate said pneumatic connection to said at least one pneumatically-actuated piston for supplying pneumatic pressure;
b) wherein said switch is also structured and arranged, when in a second position, to de-activate said pneumatic connection to said at least one pneumatically-actuated piston for supplying pneumatic pressure;
c) wherein said switch is structured and arranged to be operable by the reverse gear actuator; and
d) wherein said switch is structured and arranged to be activated when the transmission is placed into reverse gear and to be deactivated when the transmission is placed out of reverse gear.

21. The system according to claim 15 wherein said switch system further comprises:
a) a switch structured and arranged, in a first position, to activate said at least one piston;
b) wherein said switch is also structured and arranged, when in a second position, to de-activate said at least one piston;
c) wherein said switch is structured and arranged to be operable by the reverse gear actuator; and
d) wherein said switch is structured and arranged to be activated when the transmission is placed into reverse gear and to be deactivated when the transmission is placed out of reverse gear.

22. The system according to claim 21 further comprising an instrument panel notifier having a light, wherein said light is activated when said switch is in said first position.

23. The system according to claim 14 wherein said roof extension support further comprises at least one hinge.

24. A system, for use with an over-the-road tractor of the type used to pull a semi-trailer, to assist turning operations and streamline functioning when closing the top and side gaps at the rear of the tractor (and in front of the semi-trailer), comprising, in combination:
a) a tractor;
b) at least one side panel structured and arranged to be hingedly attached to said tractor to essentially respectively cover each respective side gap;
c) at least one return spring attached to each said at least one side panel; and
d) at least one rotator attached to the rear end of said at least one side panel, wherein said rotator is structured and arranged to assist a sliding of said rear end of said side panel along a side of the semi-trailer;
e) wherein said rotator comprises multiple sets of substantially different radii from a rotation-center of said rotator.

25. The system according to claim 24 wherein said at least one rotator comprises a sprocket having a first central axis of rotation and multiple peripheral wheels each having a respective second axis of rotation.

26. The system according to claim 25 wherein said sprocket comprises five said peripheral wheels.

27. A system, for use with an over-the-road tractor of the type used to pull a semi-trailer, to assist turning operations and efficient air flow when substantially covering top and side gaps at a rear of the tractor (and in front of the semi-trailer), comprising, in combination:
a) a tractor having a transmission with a reverse gear actuator and an air supply of compressed air;
b) two side panels, each said side panel being respectively hingedly attached to said tractor to essentially cover each respective side gap;
c) at least one respective return spring attached to each respective side panel; and
d) at least one rotator attached about every two vertical feet to each respective said rear end of each respective said side panel wherein each said rotator is structured and arranged to assist a sliding of each said respective rear end of each said respective side panel along each respective side of the semi-trailer;
e) wherein at least one said rotator comprises:
i) a sprocket having five peripheral wheels,
ii) wherein said sprocket rotates around a first central axis and each respective said five peripheral wheels independently rotate around a respective second central axis, f) a roof extension comprising a rearward extension element at about the level of a roof of the cab;

g) wherein said roof extension comprises a wear-plate structured and arranged to assist said roof extension to slide over a top of the semi-trailer when the semi-trailer is coupled to the tractor; and h) a roof extension support structured and arranged to
i) support, in a normally substantially horizontal position said roof extension from a rear portion of the cab, and
ii) permit said roof extension to swivel upward and rearward, i) wherein said roof extension support comprises at least one hinge; and j) a pneumatically-powered piston system attached to said air supply, for supplying pneumatic pressure to said at least one piston, of said tractor structured and arranged to extend said at least one piston in such manner as to swivel said roof extension upward and rearward; and k) a switch system, attached solely to the tractor, structured and arranged to activate said pneumatically-powered piston system comprising,
   i) a switch structured and arranged, in a first position, to activate said at least one pneumatically-actuated piston for supplying pneumatic pressure,
   ii) wherein said switch is also structured and arranged, when in a second position, to de-activate said at least one pneumatically-actuated piston for supplying pneumatic pressure,
   iii) wherein said switch is structured and arranged to be operable by said reverse gear actuator, and
   iv) wherein said switch is structured and arranged to be activated when said transmission is placed into a reverse gear and to be deactivated when said transmission is placed out of a reverse gear.

28. The system according to claim 27 wherein each said side panel further comprises a rolled end portion structured and arranged to strengthen said side panel and support at least one said rotator.

\* \* \* \* \*